(12) United States Patent
Vitaletti

(10) Patent No.: US 8,590,029 B2
(45) Date of Patent: Nov. 19, 2013

(54) MANAGEMENT OF ACCESS AUTHORIZATION TO WEB FORUMS OPEN TO ANONYMOUS USERS WITHIN AN ORGANIZATION

(75) Inventor: Marcello Vitaletti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 804 days.

(21) Appl. No.: 12/348,399

(22) Filed: Jan. 5, 2009

(65) Prior Publication Data
US 2010/0175119 A1   Jul. 8, 2010

(51) Int. Cl.
*H04L 29/06* (2006.01)

(52) U.S. Cl.
USPC ............ 726/9; 726/2; 726/4; 726/10; 726/17; 726/20; 726/21; 726/28; 713/185; 380/277; 380/278; 380/279

(58) Field of Classification Search
USPC ........ 713/185; 726/2–4, 9, 10, 17, 20, 21, 28; 380/277–279
See application file for complete search history.

(56) References Cited

U.S. PATENT DOCUMENTS

| | | | |
|---|---|---|---|
| 6,446,052 B1 | 9/2002 | Juels | |
| 6,959,281 B1 | 10/2005 | Freeling et al. | |
| 7,213,032 B2 | 5/2007 | Mascarenha | |
| 7,594,258 B2* | 9/2009 | Mao et al. | 726/9 |
| 7,753,795 B2* | 7/2010 | Harris et al. | 463/42 |
| 2003/0172067 A1 | 9/2003 | Adar et al. | |
| 2004/0078475 A1* | 4/2004 | Camenisch et al. | 709/229 |
| 2005/0239447 A1* | 10/2005 | Holzman et al. | 455/414.3 |
| 2006/0155999 A1* | 7/2006 | Holtzman et al. | 713/172 |
| 2008/0172391 A1* | 7/2008 | Adelman et al. | 707/9 |
| 2009/0178125 A1* | 7/2009 | Barber et al. | 726/6 |
| 2009/0292927 A1* | 11/2009 | Wenzel et al. | 713/185 |
| 2011/0060694 A1* | 3/2011 | Rao et al. | 705/319 |

* cited by examiner

*Primary Examiner* — Harunur Rashid
*Assistant Examiner* — Gary Lavelle
(74) *Attorney, Agent, or Firm* — Stephen R. Tkacs; Stephen J. Walder, Jr.; John D. Flynn

(57) ABSTRACT

A mechanism is provided for managing access authorization to forums open to anonymous users within an organization. A token distributor application provides a unique token to each member of a community or organization. The application is trusted by all members to not store an association between the authenticated user and the token when a token is assigned. The only control exerted by the token distributor is to block users who have already obtained a token from receiving another token. The communication tool or collaboration space may accept creation of a new anonymous identity, such as a nickname, to any individual supplying a token assigned by the token distributor application. An administrator may ban users by token. A banned user cannot access the communication tool or collaboration space using a nickname associated with a banned token.

20 Claims, 4 Drawing Sheets

MANAGEMENT OF ACCESS AUTHORIZATION TO WEB FORUMS OPEN TO ANONYMOUS USERS WITHIN AN ORGANIZATION

BACKGROUND

The present application relates generally to an improved data processing apparatus and method and more specifically to an apparatus and method for managing access authorization to Web forums open to anonymous users within an organization.

The World Wide Web provides many forums for users to communicate. Many providers of content on the Web allow users to post comments. News articles, social networking profiles, photograph sharing site, Web log (blog) entries, etc. often include a section for users to post comments. These comment tools are instrumental in providing a voice to users and in keeping the attention of users to which advertisements may be targeted.

Organizations and communities may use anonymous blogs, forums, or collaboration spaces where members of the organization may anonymously provide opinions on matters of interest to the organization or community. Given the anonymity of the members, these tools may also be used by some members to cause harm to the organization or community, or to other individuals. The content in blogs, forums, comments, and the like may serve to undermine authority, destroy the integrity of the work of others, or bully, ridicule, or embarrass an individual.

To solve this problem, administrators must monitor the posted content and remove any harmful content. When offenses are repeated, the administrator may decide to ban the offender from access to the communication tool.

Using such anonymous communication tools, a user typically chooses a recognizable nickname, also referred to as a screen name, user name, or alias, for example. These nicknames may be used by members to establish an identity without sacrificing anonymity. Unfortunately, any access control based on such an "anonymous identity" can be easily circumvented by malicious offenders. For example, an offender may simply apply for a new nickname and repeat the malicious behavior. Therefore, solutions that guarantee 100% anonymity require constant monitoring of posted content by a censorship team before it can be publicly seen. Although offenses may come from a single individual, or a minority of individuals, it is not possible to bar one or more individuals from access completely while still maintaining anonymity.

SUMMARY

In one illustrative embodiment, a method, in a data processing system, is provided for managing access authorization to a communication forum. The method comprises generating a user member list identifying a plurality of users authorized to access a communication forum, wherein a token is generated for each user in the user member list to form a token list without storing an association between the token and the user. The method further comprises, responsive to receiving from a given user a token from the token list, registering the given user as being authorized to access the communication forum.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for managing access authorization to Web forums open to anonymous users within an organization. A token distributor application provides a unique token to each member of a community or organization. The application must be trusted by all members to not store an association between the authenticated user and the token when a token is assigned. The only control exerted by the token distributor is to block users who have already obtained a token from receiving another token.

In order to allow validation by its intended consumers a token would be a data structure signed by using the private key of the token distributor digital certificate. The content of this data structure for tokens that grant access to a given survey (or application) would generally include the following information: creation date; expiration date; survey (or application) name; survey (or application) UUID: a unique universal identifier generated by the token distributor, included to make the token uniquely associated to—and only functional for—its intended purpose; token-ID: a token index making the token content unique within the set of tokens created for a given survey (or application). The token-ID should be randomized so that it must not be possible to infer the identity of the presenting user by knowing for example that he/she was the last one for which the token distributor did generate a token.

The communication tool or collaboration space may accept creation of a new anonymous identity, such as a nickname, to any individual supplying a token assigned by the token distributor application. A user may then create a password to be associated with the nickname. The user may then access the communication tool or collaboration space using the nickname and password. The user needs not trust the communication tool or collaboration space. The user needs only trust the token distributor, which may be a separate service, such as a trusted third party.

An administrator may then ban users by token. A banned user cannot access the communication tool or collaboration space using a nickname associated with a banned token. A banned user cannot simply create a new nickname without a token. The token distributor application will only assign a new token to a user if the user is authorized by an administrator to receive a token.

Figure 1:
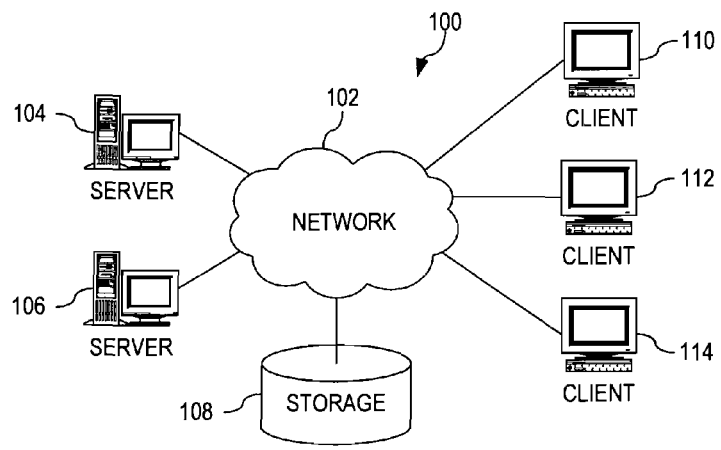
FIG. 1 depicts a pictorial representation of an example distributed data processing system in which aspects of the illustrative embodiments may be implemented.
Figure 2:
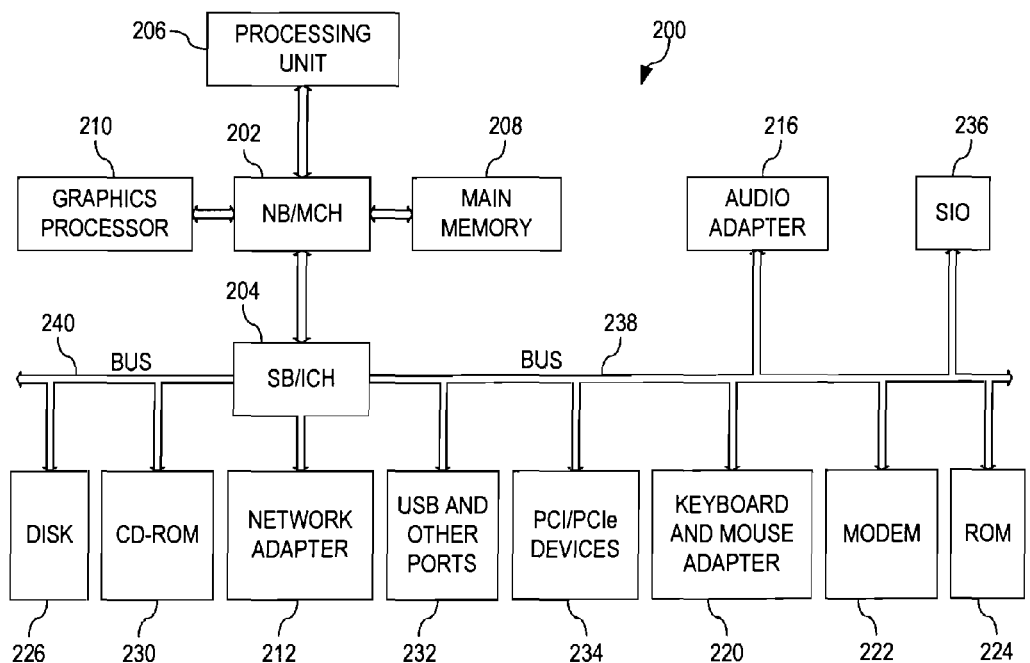
FIG. 2 is a block diagram of an example data processing system in which aspects of the illustrative embodiments may be implemented.

The illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a distributed data processing implementation, this is only an example and is not intended to state or imply any limitation with regard to the features of the present invention. To the contrary, the illustrative embodiments are intended to include single data processing device environments and embodiments.

With reference now to the figures and in particular with reference to FIGS. 1 and 2, example diagrams of data processing environments are provided in which illustrative embodiments of the present invention may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

In one illustrative embodiment, server 104 may have a communication tool or collaboration space embodied thereon. Users at clients 110, 112, 114 may access the communication tool on server 104 via network 102. A token distributor application may be embodied on server 104 or server 106. An administrator of the communication tool may provide a user member list to the token distributor application, which then generates a token for each user in the user member list. The user member list is a list of users that are part of the organization or community. For example, administrator may provide a list of individuals collaborating on a project, members of a fan club, or employees of a company.

When a user creates an anonymous identity, such as a nickname, to use the communication tool, the token distributor application provides a token if the user belongs to the user member list and is authorized to receive a token. The token distributor application does not store an association between the actual identity of the user and the token. The communication tool then creates an entry for the user in a registry that includes the token and the anonymous nickname. The user may also create a password, which is also stored in association with the token and the nickname.

If an administrator identifies a user that repeatedly engages in malicious behavior, the administrator may ban the user. The administrator may ban the user by setting a ban flag in the registry in association with the token. Even if the user attempts to change the anonymous nickname, the token itself is banned, and any user attempting to use a nickname that is associated with a banned token is denied access to the communication tool.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
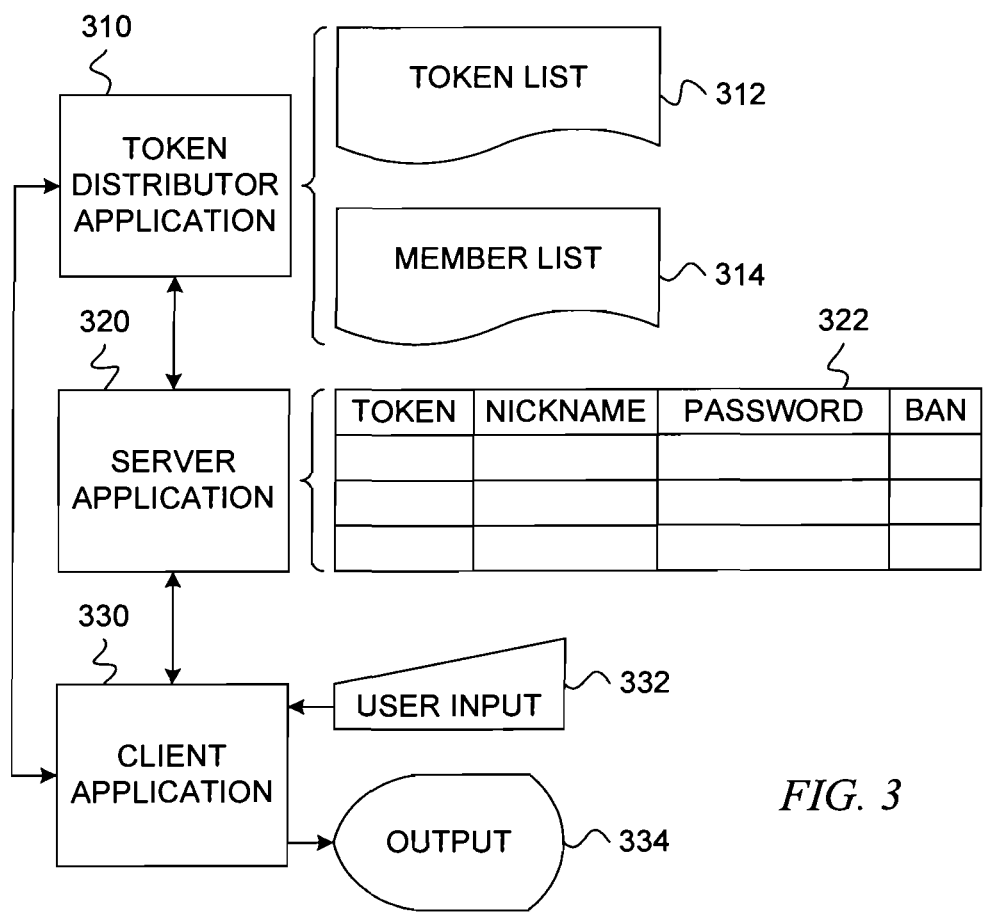
FIG. 3 is a block diagram illustrating a collaboration system in accordance with an illustrative embodiment.

FIG. 3 is a block diagram illustrating a collaboration system in accordance with an illustrative embodiment. The collaboration system may be a Web log (blog), message board, chat system, media sharing system, or the like. The collaboration system functionality may be provided by server application 320. An administrator of the collaboration system may provide member list 314 to token distributor application 310. Member list 314 may be a closed list of user members that are authorized to communicate in the collaboration system. For example, member list 314 may be a list of employees in a department, a list of individuals contributing to a project, a list of members of a fan club, or the like. The administrator may add or remove users from member list 314. For instance, an administrator may expand the user member list 314 as individuals join the group, project, club, or community. Users may be identified in user member list 314 by name, employee number, social security number, or any other real life identification.

Token distributor application 310 generates a token in token list 312 for each user in member list 314. The number of unassigned tokens in token list 312 matches the number of users in member list 314 for which a token has not been assigned. Therefore, if the administrator adds a user to member list 314, token distributor application adds an unassigned token to unassigned token list 312. However, token distributor application 310 does not store any one-to-one association between tokens in token list 312 and the real life identification of users in member list 314. In order to allow validation by its intended consumers a token would be a data structure signed using a private key of the token distributor digital certificate. The content of this data structure for tokens that grant access to a given survey (or application) would generally include the following information: creation date; expiration date; survey (or application) name; survey (or application) UUID: a unique universal identifier generated by the token distributor, included to make the token uniquely associated to—and only functional for—its intended purpose; token-ID: a token index making the token content unique within the set of tokens created for a given survey (or application). The token-ID should be randomized so that it must not be possible to infer the identity of the presenting user by knowing for example that he/she was the last one for which the token distributor did generate a token.

Making tokens available to the intended users can be done by requiring the user to connect into the token distributor application. In this case, user at client application 330 may request a token from token distributor application 310 after successful authentication. In response, token distributor application 310 may select a token from token list 312 and provide it to the requesting user at client application 330. The user may enter the request using user input device 332, the client application 330 may then present the token value to the user at output device 334. Token distributor application may mark the token in token list 312 as having been assigned and mark the user as having been assigned a token in member list 314.

Token distributor application 310 may mark the token has having been assigned in token list 312 by removing the token from token list 312. In an alternative embodiment, token distributor application 310 marks the token as having been assigned by setting a flag in association with the token in token list 312. Token distributor application 310 may mark the user in member list 314 by removing the user from member list 314. Alternatively, token distributor application 310 may mark the user as having been assigned a token by setting a flag in association with the user identification in member list 314. Thus, the token distributor application 310 may identify users that have been assigned tokens and users that have not been assigned tokens, but cannot identify which tokens have been assigned to which users.

In an alternative embodiment, tokens can be made available to the intended users without requiring the users to connect into and to authenticate with the token distributor application. In this case, the e-mail address of each intended user must be provided by the administrator when requesting tokens for a group of users to access a new survey or application. In this case, the token distributor may simply e-mail one generated token to one e-mail address. Also in this case, the token distributor application 310 must not store an association between the real life identity of the user and the assigned token.

The user at client application 330 may then register for the collaboration system at server application 320. The user provides the token to server application 320, which may in turn determine whether the token is valid. The server application 320 must authenticate the token by determining whether the token is digitally signed by the trusted token distributor application 310 and whether it was generated for the intended purpose of accessing the application 320.

The user at client 330 further provides a nickname via user input device 332. The nickname provides an anonymous user identity with which may participate in the collaboration system while maintaining anonymity. Server application 320 stores a registration entry in registry 322 for the user. The registration entry includes the token and the nickname. The token may be used as a password; however, server application 320 may allow the user to select a more familiar password, which is stored in the registration entry. Server application 320 may allow the user to change the nickname and password, but may require that the user provide the assigned token to make such a change.

If the administrator observes a user engaging in malicious or disruptive behavior, which may be in violation of a Terms of Service (TOS) agreement, the administrator may ban the user from access to the collaboration system. In the depicted example, the administrator would ban the user by setting a ban flag in association with the user's nickname and, more specifically, the user's token in registry 322. Because the ban is associated with the token, the user cannot simply apply for another nickname to circumvent the ban; the user would have to request another token from token distributor application 310.

The administrator may reinstate a user by requesting the token distributor application 310 to add the user again to member list 314, or mark the user in member list 314 as not having been assigned a token, in response to which token distributor application 310 would generate another token in token list 312. The user may then request another token from token distributor application 310.

Thus, user anonymity is preserved throughout participation in the collaboration system. Neither token distributor application 310 nor server application 320 stores an association between the real life identity of the user and the token assigned to the user. Even banned users remain anonymous. The only time a user may compromise anonymity is when he or she requests reinstatement. If a user is a repeat offender, the administrator may enact a more sever ban, such as a lifetime ban, by setting a flag (not shown) in member list 314.

Furthermore, users need only trust the token distributor application 310, which may be a separate service, possibly run by a third party. The user needs not trust server application 320, because the user does not provide any real life identification to the server application 320. That is, the user needs not trust any application with which he or she interacts anonymously, but only trusts the token distributor 310 to not store any association between real life identity and the token.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
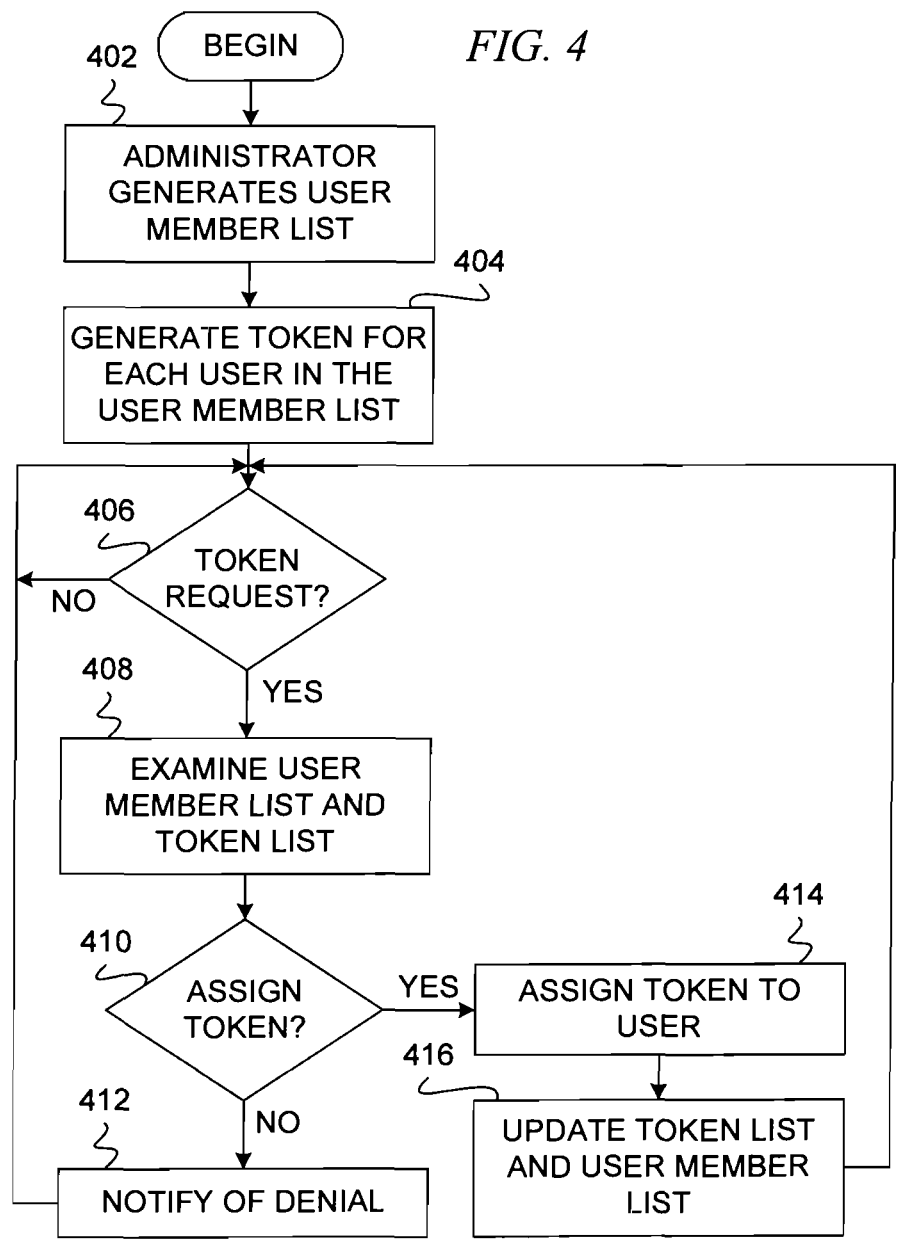
FIG. 4 provides a flowchart outlining example operations of a token distributor in accordance with an illustrative embodiment.

FIG. 4 provides a flowchart outlining example operations of a token distributor in accordance with an illustrative embodiment. Operation begins, and an administrator generates a user member list (block 402). The token distributor generates a token for each member in the user member list (block 404). Then, the token distributor determines whether a token request is received from a user (block 406). If a token request is not received, operation returns to block 406 to determine whether a token request is received.

If a token request is received in block 406, the token distributor examines the user member list and token list (block 408) and determines whether to assign a token to the user (block 410). The token distributor may determine to not assign a token to the user if the user is not found in the user member list, if the user member list indicates that the user has already been assigned a token, or if there is not an assignable token in the token list, for example. If the token distributor determines to not assign a token to the user, the token distributor sends a notification of denial message to the user (block 412), and operation returns to block 406 to determine whether a token request is received.

If the token distributor determines to assign a token to the user in block 410, the token distributor assigns a token from the token list to the user (block 414). Then, the token distributor updates the token list and the user member list (block 416). Thereafter, operation returns to block 406 to determine whether a token request is received.

Although not shown in FIG. 4, the administrator may add a user to the member list, in response to which the token distributor may generate a new token in the token list.

Figure 5:
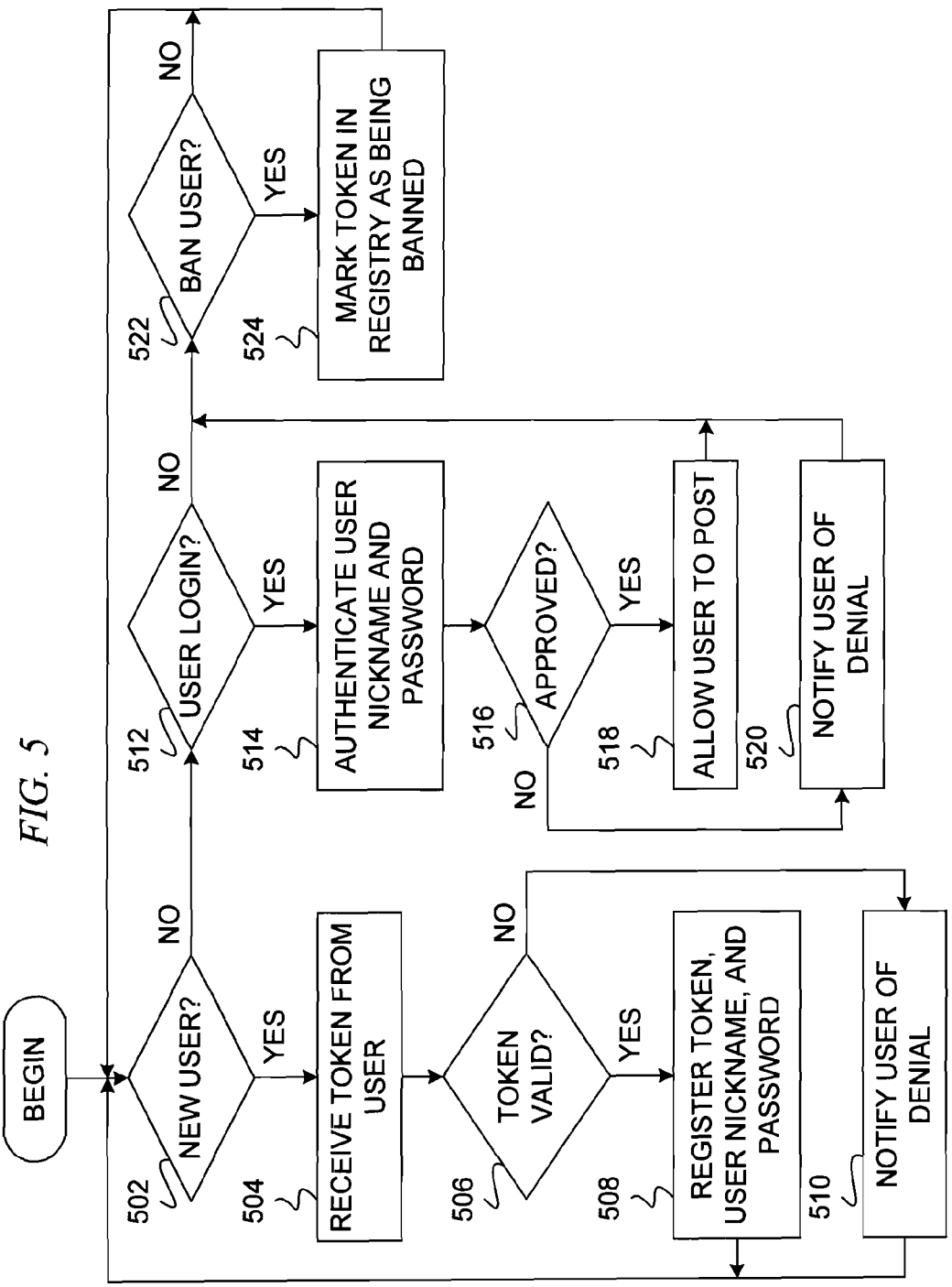
FIG. 5 provides a flowchart outlining example operations of a collaboration system server in accordance with an illustrative embodiment.

FIG. 5 provides a flowchart outlining example operations of a collaboration system server in accordance with an illustrative embodiment. Operation begins, and the collaboration system server determines whether a new user is registering for access to the collaboration system (block 502). If a user is registering for access to the system, the collaboration system server receives a token from the user (block 504). Then, the collaboration system server authenticates the token by verifying that it was generated (and signed) by the trusted token distributor application and determines whether the token is valid (block 506). If the token is valid, the collaboration system server registers the user's token, nickname, and password in a registry (block 508), and operation returns to block 502 to determine whether a new user is registering for access to the system. If the token is not valid in block 506, the collaboration system server notifies the user of denial (block 510), and operation returns to block 502 to determine whether a new user is registering for access to the system.

If a new user is not registering for access to the collaboration system in block 502, the collaboration system server determines whether a user is requesting to log into the collaboration system (block 512). If a user is logging in, the collaboration system server authenticates the user nickname and password by checking the supplied nickname and password against the registry (block 514), and determines whether to approve or deny access to the user (block 516). If the collaboration system server approves the user, the collaboration system server allows the user to post content to the collaboration system (block 518), and operation proceeds to block 522. If the user nickname or password does not match the registry, or if the user is banned, in block 516, the collaboration system denies access to the user. Thus, the collaboration system server notifies the user of denial (block 520), and operation proceeds to block 522.

In block 522, the collaboration system determines whether the administrator instructs to ban a user. If the administrator does not instruct to ban a user, operation returns to block 502 to determine whether a new user is registering for access to the system. If the administrator does instruct to ban a user in block 522, the collaboration system server marks the token associated with the banned user in the registry as being banned (block 524). Thereafter, operation returns to block 502 to determine whether a new user is registering for access to the system.

Thus, the illustrative embodiments provide mechanisms for managing access authorization to Web forums open to anonymous users within an organization. A token distributor application provides a unique token to each member of a community or organization. The token distributor application may choose the token at random from a predefined collection. The application must be trusted by all members to not store an association between the authenticated user and the token when a token is assigned. The only control exerted by the token distributor is to block users who have already obtained a token from receiving another token.

The communication tool or collaboration space may accept creation of a new anonymous identity, such as a nickname, to any individual supplying a token assigned by the token distributor application. An administrator may ban users by token. A banned user cannot access the communication tool or collaboration space using a nickname associated with a banned token. A banned user cannot simply create a new nickname without a token. The token distributor application will only assign a new token to a user if the user is authorized by an administrator to receive a token.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for managing access authorization to a communication forum, the method comprising:
  generating, by a server application in the data processing system, a user member list identifying a plurality of users authorized to access a communication forum, wherein a token distributor generates a token for each user in the user member list to form a token list without storing an association between the token and the user, wherein a number of tokens generated by the token distributor matches a number of users in the user member list;
  responsive to receiving, from a given user, a token from the token list, registering, by the server application, the given user as being authorized to access the communication forum, wherein registering the given user comprises generating a registration entry for the given user in a registry, wherein the registration entry stores an anonymous identity in association with the token;
  responsive to an instruction to ban an offending user, setting, by the server application, a ban flag in association with a token for the offending user in the registry;
  receiving, by the server application, a request for access from a requesting user, wherein the request for access comprises a given anonymous identity; and
  denying, by the server application, the request for access responsive to the given anonymous identity of the request for access matching a banned registration entry in the registry.

2. The method of claim 1, wherein ken distributor stores the user member list and the token list.

3. The method of claim 2, wherein responsive to receiving a request for a token from a requesting user, the token distributor determines whether the requesting user belongs to the user member list and the requesting user has not been assigned a token and an assignable token belongs to the token list; and
  wherein responsive to a determination that the requesting user belongs to the user member list and the requesting user has not been assigned a token and an assignable token belongs to the token list, the token distributor assigns a selected token from the token list to the requesting user.

4. The method of claim 3, wherein responsive to assigning the selected token to the requesting user, the token distributor marks the token as having been assigned in the token list and marks the requesting user as having been assigned a token in the user member list.

5. The method of claim 1, wherein registering the given user further comprises:
  storing a user selected password in association with the token and the anonymous identity in the registration entry.

6. The method of claim 1, further comprising:
  responsive to an instruction to enact a lifetime ban on a repeat offender user, setting a lifetime ban flag in association with the repeat offender user in the member list.

7. The method of claim 1, further comprising:
  receiving a registration request from a registering user, wherein the registration request comprises a submitted token; and
  denying the registration request responsive to the submitted token matching a banned registration entry in the registry.

8. The method of claim 1, further comprising:
  authenticating the received token and registering the given user responsive to the received token being identified as a valid assigned token.

9. A computer program product comprising a non-transitory computer useable medium having a computer readable program thereon, wherein the computer readable program, when executed on a computing device, causes the computing device to:
  generate a user member list identifying a plurality of users authorized to access a communication forum, wherein a token distributor generates a token for each user in the user member list to form a token list without storing an association between the token and the user, wherein a number of tokens generated by the token distributor matches a number of users in the user member list;

responsive to receiving, from a given user, a token from the token list, register the given user as being authorized to access the communication forum, wherein registering the given user comprises generating a registration entry for the given user in a registry, wherein the registration entry stores an anonymous identity in association with the token;

responsive to an instruction to ban an offending user, set a ban flag in association with a token for the offending user in the registry;

receive a request for access from a requesting user, wherein the request for access comprises a given anonymous identity; and deny the request for access responsive to the given anonymous identity of the request for access matching a banned registration entry in the registry.

10. The computer program product of claim 9, wherein registering the given user further comprises:

storing a user selected password in association with the token and the anonymous identity in the registration entry.

11. The computer program product of claim 9, wherein the computer readable program further causes the computing device to:

responsive to an instruction to enact a lifetime ban on a repeat offender user, set a lifetime ban flag in association with the repeat offender user in the member list.

12. The computer program product of claim 9, wherein the computer readable program further causes the computing device to:

receive a registration request from a registering user, wherein the registration request comprises a submitted token; and deny the registration request responsive to the submitted token matching a banned registration entry in the registry.

13. The computer program product of claim 9, wherein the computer readable program further causes the computing device to:

authenticate the received token and register the given user responsive to the received token being identified as a valid assigned token.

14. The computer program product of claim 9, wherein the token distributor stores the user member list and the token list;

wherein responsive to receiving a request for a token from a requesting user, the token distributor determines whether the requesting user belongs to the user member list and the requesting user has not been assigned a token and an assignable token belongs to the token list;

wherein responsive to a determination that the requesting user belongs to the user member list and the requesting user has not been assigned a token and an assignable token belongs to the token list, the token distributor assigns a selected token from the token list to the requesting user; and wherein responsive to assigning the selected token to the requesting user, the token distributor marks the token as having been assigned in the token list and marks the requesting user as having been assigned a token in the user member list.

15. An apparatus, comprising:

a processor; and a memory coupled to the processor, wherein the memory comprises instructions which, when executed by the processor, cause the processor to:

generate a user member list identifying a plurality of users authorized to access a communication forum, wherein a token distributor generates a token for each user in the user member list to form a token list without storing an association between the token and the user, wherein a number of tokens generated by the token distributor matches a number of users in the user member list;

responsive to receiving, from a given user, a token from the token list, register the given user as being authorized to access the communication forum, wherein registering the given user comprises generating a registration entry for the given user in a registry, wherein the registration entry stores an anonymous identity in association with the token;

responsive to an instruction to ban an offending user, set a ban flag in association with a token for the offending user in the registry;

receive a request for access from a requesting user, wherein the request for access comprises a given anonymous identity; and deny the request for access responsive to the given anonymous identity of the request for access matching a banned registration entry in the registry.

16. The apparatus of claim 15, wherein registering the given user further comprises:

storing a user selected password in association with the token and the anonymous identity in the registration entry.

17. The apparatus of claim 15, wherein the instructions further cause the processor to:

responsive to an instruction to enact a lifetime ban on a repeat offender user, set a lifetime ban flag in association with the repeat offender user in the member list.

18. The apparatus of claim 15, wherein the instructions further cause the processor to:

receive a registration request from a registering user, wherein the registration request comprises a submitted token; and deny the registration request responsive to the submitted token matching a banned registration entry in the registry.

19. The apparatus of claim 15, wherein the token distributor stores the user member list and the token list;

wherein responsive to receiving a request for a token from a requesting user, the token distributor determines whether the requesting user belongs to the user member list and the requesting user has not been assigned a token and an assignable token belongs to the token list;

wherein responsive to a determination that the requesting user belongs to the user member list and the requesting user has not been assigned a token and an assignable token belongs to the token list, the token distributor assigns a selected token from the token list to the requesting user; and wherein responsive to assigning the selected token to the requesting user, the token distributor marks the token as having been assigned in the token list and marks the requesting user as having been assigned a token in the user member list.

20. The apparatus of claim 15, wherein the instructions further cause the processor to:
   authenticate the received token and register the given user responsive to the received token being identified as a valid assigned token.

* * * * *